Nov. 23, 1965  S. J. FRITZ  3,219,288
BALLISTICALLY ACTUATED DEVICE FOR WINDING
IN AN ELONGATED FLEXIBLE ELEMENT
Filed May 17, 1963  2 Sheets-Sheet 1
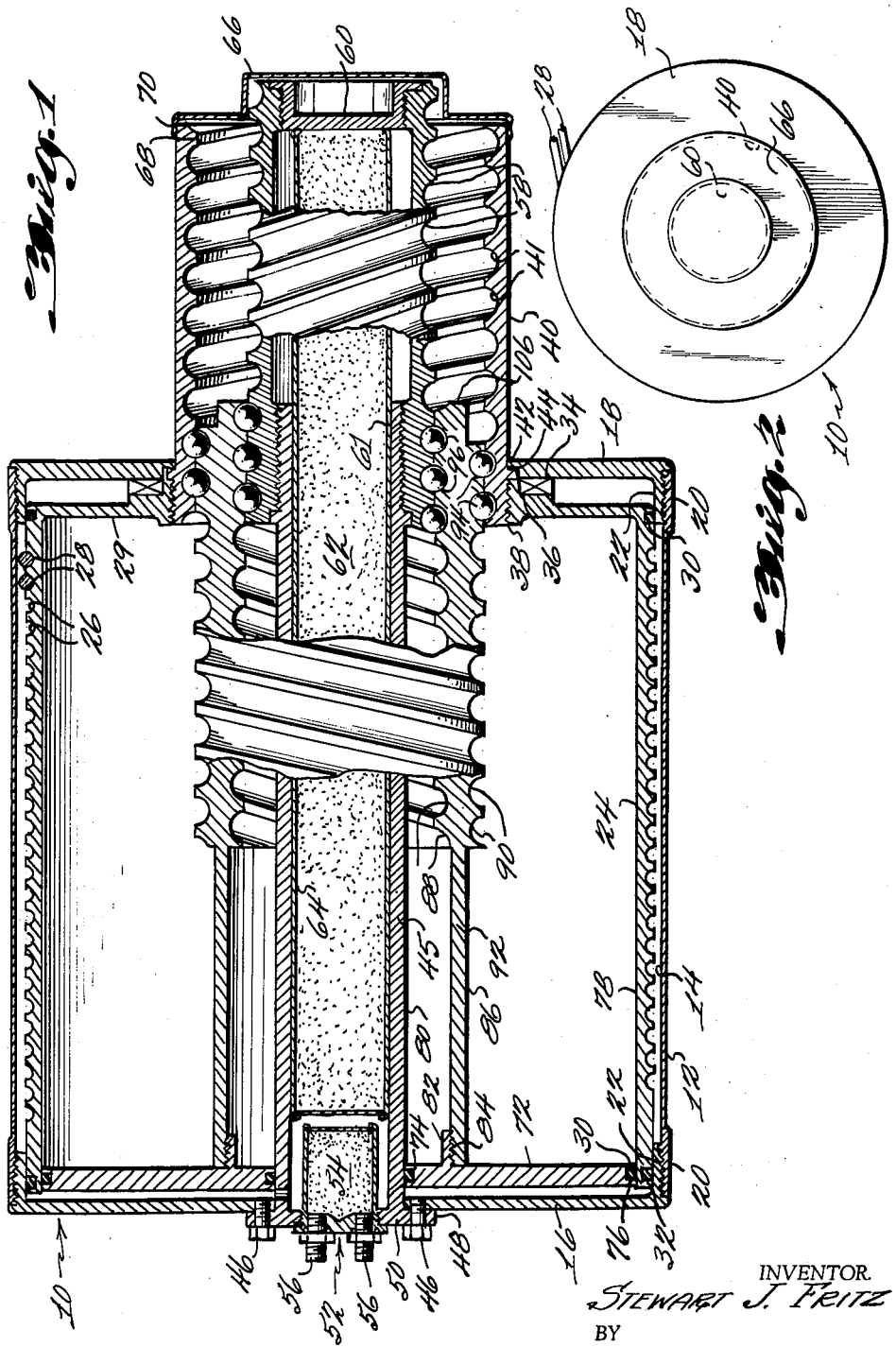
INVENTOR.
STEWART J. FRITZ
BY
Cushman Darby Cushman
ATTORNEYS Nov. 23, 1965  S. J. FRITZ  3,219,288
BALLISTICALLY ACTUATED DEVICE FOR WINDING
IN AN ELONGATED FLEXIBLE ELEMENT
Filed May 17, 1963  2 Sheets-Sheet 2
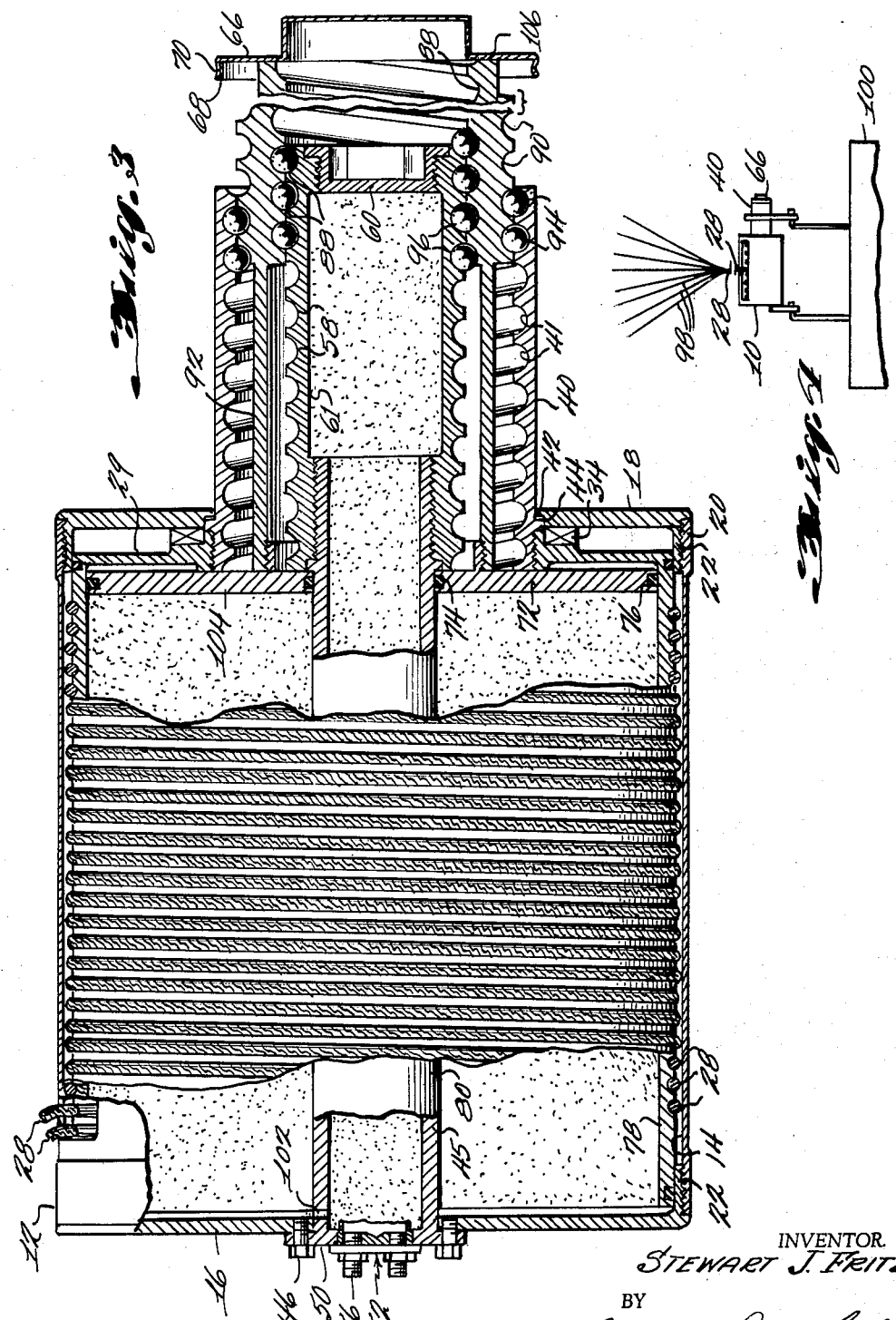
INVENTOR.
STEWART J. FRITZ
BY
Cushman Darby & Cushman
ATTORNEYS

United States Patent Office 3,219,288
Patented Nov. 23, 1965

3,219,288
BALLISTICALLY ACTUATED DEVICE FOR WINDING IN AN ELONGATED FLEXIBLE ELEMENT
Stewart J. Fritz, Scottsdale, Ariz., assignor to Rocket Power, Inc., Mesa, Ariz., a corporation of Arizona
Filed May 17, 1963, Ser. No. 281,201
13 Claims. (Cl. 242—54)

This invention relates to ballistically actuated reels and more particularly to a ballistically actuated device for winding in an elongated flexible element.

Although the device of the present invention would have applicability in any environment where the rapid reeling in of an elongated flexible element is desired, the device is particularly useful in conjunction with cargo parachutes for reducing the landing speed of the cargo as it approaches the earth, the manner of operation of the device being somewhat similar to that disclosed in the patent to Smith 2,477,907 issued August 2, 1947 and to my commonly assigned copending application Serial No. 188,619 filed April 19, 1962, now Patent No. 3,109,615.

Two of the prime requisites for any device that is to be carried aloft as in a missile or aircraft and then dropped in associated with a desired soft landing of some object such as cargo or personnel, are that the device be compact as well as completely reliable.

For the winding in of a flexible element, such as the straps of parachute harness, during the descent if the parachute, devices of the type disclosed in my above mentioned application have proven extremely reliable and are quite compact. However, in some applications especially where weight and overall package size present a particularly difficult problem it has been found that it is desirable to present a much more compact cable retractor than can be achieved using the deisgns of the prior art, including that of my above mentioned application.

It is therefore a primary object of this invention to provide a completely reliable ballistically actuated cable retractor contained within an extremely compact package.

It is a further object of the present invention to provide a cable retractor comprising a housed, rotatable reel operatively connected to a ballistically translated, rotatable piston assembly disposed in part within the reel, coaxial with the reel.

Another object of the invention is to provide a ballistically actuated cable retractor having a reel rotating piston assembly that is translatable and rotatable upon helical groove and ball threads formed both interiorly and exteriorly of said piston assembly.

A more general object of the invention is to provide a ballistically actuated cable retractor in which a substantially greater amount of cable is retracted for each unit of piston travel than is obtained by the retractors of the prior art.

These and other objects of this invention will become more clearly apparent in the following detailed explanation in which specific reference is made to the attached drawings wherein an embodiment of the invention is illustrated, not to limit the scope of the invention of any manner, but in order that the principles thereof might be more easily and lucidly understandable.

In the drawings:

FIGURE 1 is a longitudinal sectional view, with some elements partially in elevation, of the retractor before ballistic actuation;

FIGURE 2 is an end elevational view of the retractor before actuation;

FIGURE 3 is a longitudinal sectional view, with some elements partially in elevation, of the retractor after ballistic actuation; and FIGURE 4 is a fragmentary elevational view of the retractor, somewhat reduced in size, in use retracting cables attached to descending cargo parachute.

Referring to FIGURE 1, a retractor 10, is shown having a generally hollow cylindrical wall 12 defining a reel receiving chamber 14 therewithin. The peripheral wall 12 is delimited at either end by end closures 16 and 18 which are preferably secured to the peripheral wall adjacent the ends thereof as by interior threads 20 on said wall cooperating with exterior threads on inwardly directed longitudinally extending annular extensions 22 which form integral parts of the spaced end closures 16 and 18.

Coaxially positioned within the chamber 14 is a generally hollow cylindrical reel 24 having at least one helical cable receiving groove formed in the outer periphery thereof and extending over a major portion of the reel periphery intermediate the two ends of the reel. As shown, the reel 24 contains two generally parallel helical, cable receiving grooves 26 in the outer surface thereof and two cables 28 firmly attached to the reel 24 and seated in the grooves to be windable on the reel. Adjacent the end of the reel nearest the end closure 18, a radially inwardly directed annular extension 29 is located preferably having the outer periphery thereof integrally joined to the reel. As shown, the reel 24 contains at least one ring-like sealing element 30 seated in a groove 32 adjacent each end of the reel in the unthreaded portions of the outer periphery of the reel. A ring-like thrust bearing 34 is preferably located in an L-shaped annular seat 36 on the exterior of the extension 29. It can thus easily be seen that the rings 30 provide a seal between the exterior of the reel 24 and the interior of the annular extensions 22. Additionally, because the rings 30 are preferably formed of self-lubricating material such as Teflon, Kel-F or the like, they act as bearings to facilitate the rotation of the reel during cable retraction.

Fixedly secured to the reel extension 29 as by threads 38 on the radially inner end thereof is a generally hollow cylindrical member 40 having helical grooves 41 extending along the entire interior peripheral surface of the member for purposes more fully explained hereinafter. As can clearly be seen in FIGURE 1, the member 40 projects outwardly of the chamber 14 through the coaxially arranged opening 42 through the end closure 18. As shown, the effect of friction during rotation of the reel is minimized by providing a labyrinth-like juncture at 44 between the interiorly grooved member 40 and the end closure 18, and primarily relying on the bearing 34 for providing support for the reel and interiorly threaded member with respect to the reel housing 14 and taking the axial thrust imposed on the assembly during the ballistically actuated cable retraction.

The charge carrying portion of the retractor 10 comprises a generally hollow cylindrical tube 45 coaxially placed centrally within the retractor and being fixedly secured to the end closure 16 by means such as bolts 46 passing through the flanged extension 48 of an integral annular cap 50 closing one end of the tube 45. A conventional electrically actuated squib or initiator 52 is positioned immediately within the end of the tube 45 that is surmounted by the integral cap 50. The initiator projects within the tube to carry a starting charge 54 and fills the gap within the cap 50 so that the electrical contacts 56 of the squib project outwardly of the cap 50. At the opposite end of the tube 45, approximately adjacent inner end of the interiorly grooved member 40, exterior helical grooves 58 are formed extending either on the tube 45, or preferably on an axial extension 61 thereof as shown, to a point preferably, but not necessarily, beyond the outer end of the interiorly grooved member 40. As illustrated in elevation, the grooves 58 are helical in the opposite sense to the grooves 41.

The charge carrying portions is completed by a plug 60 threadably received at the end of the tube 45 at its end opposite from the initiator 52 and an explosive charge 62, carried within an easily frangible cylindrical container 64 slidably received in the tube 45.

An environment excluding closure cap 66 preferably abuts the plug 60, bridges the annular gap between the exteriorly grooved extension of the tube 45 and the interiorly grooved extension of the reel 24 and is preferably formed with an annular flange 68 having a portion 70 of reduced diameter to slidably secure the cap 66 to the outer periphery of extension 40.

Housed within the chamber 14 at the end nearest the initiator 52 is an annular piston 72 having an inner sealing ring 74 seated in an annular groove in the inner peripheral surface of the piston and an outer sealing ring 76 seated in an annular groove in the outer periphery surface of the piston 72. As shown the sealing ring 74 forms a gas tight seal between the piston 72 and the smooth cylindrical surface 78 of the outer periphery of the tube 45 and the ring 76 forms a gas tight seal with the smooth cylindrical surface 80 of the inner periphery of the reel 24.

An inwardly, axially directed annular flange 82 integrally extends from the piston 72 intermediate the inner and outer radial extent of the piston. The flange 82 carries securing means such as exterior threads 84 to which an axially extending generally hollow cylindrical nut member 86 is threadably joined. As shown the nut member 86 surrounds the tube 45 and extends to a point where it is intercalated between the grooved extension of the tube 45 and the grooved extension 40 of the reel 24. The nut 86 carries helical grooves 88 in the exterior surface thereof, having the same sense as the grooves 41 and helical grooves 90 in the interior surface thereof having the same sense as the grooves 58. Preferably the grooves 88 and 90 extend along the respective outer and inner surfaces of the nut 86 only so far as they will be used during the ballistically initiated retraction as explained hereinafter, the remainder of the nut being of reduced cross section area as at 92 to decrease the weight, and therefore the inertial resistance to movement thereof.

Cooperation between the working members of the retractor is effected by a plurality of balls 96 carried between the tube extension grooves 58 and the inner nut grooves 90 and a plurality of similar balls 94 carried between the reel extension grooves 41 and the outer nut grooves 88. Conventional ball stops can be provided in the helical grooves to prevent ball run out during the advance of the piston.

Preferably, in order to increase the speed of rotation of the reel during cable retraction, all of the grooves 41, 58, 88 and 90 are in the nature of double threads, i.e. have a lead equal to twice their pitch. Although a double groove and ball system has been shown and is preferred because of the low frictional resistance provided by this type of system, it is within the purview of the invention that one or both of the systems could be replaced by other types of connections such as cooperating Acme threads or Knuckle threads.

Referring now to FIGURE 4, the cable retractor 10 of the present invention is preferably associated with a safety lowering device such as a parachute having shrouds 98 to which the cables 28 are secured and suitable means connecting the retractor 10 to the article being lowered, such as cargo 100. As more exhaustively set forth in the Smith patent mentioned above, suitable proximity devices or other means can be employed to cause the operation of the retractor to begin. Briefly, the retractor 10 is initiated when the cargo is quite near the ground. The retractor then begins to reel in the cable 28 giving the cargo 100 an upward velocity component which through careful planning of the system can result in a near canceling of the downward component of the cargo's velocity and cause the cargo to land very softly at a near zero velocity.

An understanding of the operation of the retractor of the present invention is best seen by comparing FIGURE 1, in which the device is shown before initiation, with FIGURE 3, in which the device is shown after initiation.

In operation, a conventional electrical actuator is coupled with the initiator contacts 56. An electric charge delivered to the contacts 56 quickly ignites the starting charge 54 which immediately ruptures its container and ignites the main explosive charge 62. The gases created by the combustion of the charge 54 rapidly expand and travel outwardly through ports 102 radially spaced around the tube 45 adjacent its end so that they communicate the gases with the outer face 104 of the piston 72. The piston is quickly driven by the expanding gases from the FIGURE 1 position to the FIGURE 3 position. It can easily be seen that the intercooperation provided by the double grooved nut with the balls and the grooved reel and tube extensions, results in the reel 24 rotating but not moving axially as the piston rotates and moves axially along the tube 45 within the reel 24. In rotating, the reel 24 winds the cable or cables 28 into the grooves 26, thus retracting the cables.

The retractor of the invention is specifically designed so as to comprise a most compact package before actuation. This has been accomplished by shortening the grooved extension 40 to such a point that, alone, it could not accommodate all the piston travel that would be necessary to retract a long cable, were the nut member only exteriorly threaded. Three mechanisms provided by this invention allow the desired compactness to be achieved. Firstly, the piston nut member has been provided with both interior and exterior thread-like grooves cooperating respectively with stationary tube extension grooves and revolvable reel extension grooves. Therefore, the piston 72 achieves twice the linear wind-up of cable on the drum or reel 24 for each unit of axial travel of the piston than would be the case if the nut member had only one set of cooperating grooves or threads as conventional retractors have had.

Secondly, a means separate from the outer housing of the retractor, in the form of the plug 60, has been provided to contain the explosive force of the charge 62. Therefore, the end closure groove carrying section of the present retractor is in the form of a light, slidably, removable cap 66 whose only function is to prevent dust, dirt and moisture from entering the grooves 41 and 58 prior to the use of the retractor. As can easily be seen in FIGURES 1 and 3 the length of the annular nut 86 is substantially greater than the length of the extension 40 into which it is longitudinally advanced by the travel of the piston 72. Therefore, as best shown in FIGURE 3, the outer end 106 of the nut 86 simply pushes off the cap 66 and continues to advance outwardly until the piston has come to rest at the opposite end of the chamber 14 from where it began. This particular innovation allows a great reduction in the overall length of the pre-initiated retractor.

The third innovation is in utilizing the extension 40 of the reel 24 as the interior groove carrying member and also as the outer surface of the grooved section of the retractor. This results in a substantial saving of material and weight.

In a typical retractor employing the principles of this invention, two $5/16$ inch cables, each 40 feet in length can be wound on the reel of a retractor having an overall initial length if 25.7 inches; the overall length of the retractor after cable retraction being 33.95 inches due to the axial advance of the double grooved nut member.

It should now be quite apparent that the ballistically actuated cable retraction system shown and fully described, accomplishes the objects of the invention as set forth herein above and possesses inherent structural advantages over cable retraction systems of the prior art.

It should also be realized that many modifications may be made on the illustrative embodiment of the invention described herein and shown in the drawings, without departing from the principles of this invention as clearly outlined. For this reason it is evident that the invention encompasses all modifications falling within the spirit and scope of the claims appended hereto.

What is claimed is:

1. A ballistically actuated flexible element retractor comprising an elongated housing including a pair of longitudinally spaced end closures and a peripheral wall extending therebetween defining a chamber therein; a reel mounted within said chamber for rotational movement about a longitudinal axis, said housing having an opening formed in the peripheral wall thereof communicating with said chamber, at least one elongated flexible element extending through said opening and having one end thereof fixedly secured to said reel to be wound around the exterior periphery thereof in response to rotational movement of said reel in one direction, said reel having means defining a generally cylindrical opening in the interior thereof having an axis coincident with the axis of rotation of said reel; means defining a coaxially located opening through one end closure, means for receiving a ballistic charge capable of generating high pressure gases upon ignition, said means comprising a tube mounted adjacent the second end closure and extending coaxially within said reel opening and outwardly of said chamber through the opening in said one end closure, a ballistic charge in said charge receiving means; an annular piston slidably received within said chamber circumferentially embracing said charge carrying means; said piston being movable between a first operative position adjacent said second end closure to a second operative position spaced from said second end closure, means for communicating said charge receiving tube with said chamber between said second end closure and said piston when the latter is disposed in said first operative position so that the high pressure gases created by the ignition of said charge will effect the movement of the piston from the first operative position to the second operative position; means on said piston forming a gas tight seal with the inner peripheral surface of the reel and with the outer peripheral surface of the charge receiving means; an annular sleeve carried by said piston, coaxially therewith and surrounding said charge receiving tube; an annular extension carried by said reel coaxially therewith and extending outwardly through said one end closure opening; a first interengaging helical groove and ball means between the outer periphery of said charge carrying tube adjacent the end thereof which projects through said one end closure opening and the inner periphery of said piston carried annular sleeve; a second interengaging helical groove and ball means between the outer periphery of said piston carried annular sleeve and the inner periphery of said reel carried annular extension, said first groove and ball means having an opposite direction of longitudinal advance than said second groove and ball means, whereby said first groove and ball means rotate said piston and annular sleeve in one direction during the longitudinal movement of said piston from said first to said second operative positions, and concurrently said second groove and ball means rotate said reel in the opposite direction effecting the wind up of the elongated flexible element on the reel.

2. A ballistically actuated flexible element retractor as set forth in claim 1 wherein an environment excluding cap is slidably received on the outer end of said annular reel extension.

3. A ballistically actuated flexible element retractor as set forth in claim 2 wherein the annular extension of the reel is greater than the extent of the piston annular sleeve in the direction axially toward said environment excluding cap when the piston is in its first operative position and less than the extent of the piston annular sleeve with respect to the axial direction toward said environment excluding cap when the piston is in its second operative position whereby said piston annular sleeve outwardly removes said environment excluding cap from engagement with the reel annular extension during the movement of said piston from the first to the second of its operative positions.

4. A ballistically actuated flexible element retractor as set forth in claim 1 wherein the helical grooves of said first and second interengaging groove and ball means comprise grooves having leads greater than their pitches.

5. A ballistically actuated flexible element retractor as set forth in claim 4 additionally comprising at least one elongated flexible element receiving helical groove in the outer peripheral surface of the reel.

6. A ballistically actuated flexible element retractor as set forth in claim 5 wherein two elongated flexible elements are secured to said reel and two generally parallel helical grooves are formed in the outer peripheral surface of the reel, said grooves extending on said reel to receive said elongated flexible elements therein during the ballistically initiated retraction.

7. A ballistically actuated flexible element retractor as set forth in claim 2 wherein the exterior of said retractor prior to initiation includes the outer surface of said housing peripheral wall, the outer surface of said first and second end closures, the outer peripheral surface of said reel annular extension and the outer surface of said slidably received environment excluding cap.

8. A ballistically actuated flexible element retractor as set forth in claim 7 additionally comprising an electrically actuated starting charge positioned witihn said charge receiving tube adjacent the second end closure, electrical contacts operatively connected to said starter charge and communicating with the exterior of said retractor through said second end closure; and means completely closing the end of said charge receiving tube opposite from the starting charge.

9. A ballistically actuated flexible element retractor as set forth in claim 8 wherein said charge receiving tube closure means comprises a plug threadably received within the end of said tube.

10. A ballistically actuated device for retracting an elongated flexible element comprising: an elongated, generally cylindrical reel having a longitudinally directed opening therethrough coaxial with said reel, at least one elongated flexible element secured to said reel and arranged to be wound therearound in response to rotation of said reel in one direction; a ballistic charge carrying tube extending coaxially with the reel within said opening, an annular piston received within said reel surrounding said tube; the piston being slidable in response to ballistic actuation from a first position adjacent one end of the reel to a second position within the reel and spaced inwardly from the first end thereof; means on said piston forming a gas tight seal with the inner peripheral surface of said reel and with the outer peripheral surface of said tube, annular sleeve like means extending in the direction of travel of the piston, said sleeve coaxially surrounding said charge carrying tube; a first interengaging helical thread like means operatively connecting between said reel and the outer peripheral surface of said piston sleeve; a second interengaging helical thread like means operatively engaging between the inner peripheral surface of said piston sleeve and the outer peripheral surface of said charge carrying tube, said first helical thread like means having an opposite direction of longitudinal advance from said second helical thread-like means; housing means associated with said reel, said means preventing longitudinal movement of said reel with respect to the charge carrying tube, preventing rotation of the charge carrying tube and defining a gas tight chamber with the face of the piston most nearly adjacent the first end of the reel, the outer peripheral surface of the tube and the inner peripheral surface of the reel.

11. A ballistically actuated device as set forth in claim 10 wherein said first and second interengaging helical thread-like means each comprise pairs of cooperating helical grooves containing ball members therebetween.

12. In a ballistically actuated device for winding an elongated flexible element on a hollow cylindrical reel coaxially mounted within a gas tight housing for rotational motion, the improvement comprising a longitudinally extending member coaxially mounted within the housing and within the reel, said member being fixedly mounted with respect to said housing to preclude rotation of said member; an annular piston slidably received within said reel and being movable in response to ballistic actuation, from a first position adjacent one end of the reel to a second position within the reel but spaced from the first end thereof; an annular sleeve carried coaxially by said reel surrounding the longitudinally extending member, said sleeve projecting from the piston in the direction of travel of the piston from said first to said second position thereof; first interengaging helical thread like means operatively connecting the outer peripheral surface of the longitudinally extending member and the inner peripheral surface of the piston sleeve; second interengaging helical thread like means operatively connecting the outer peripheral surface of the piston sleeve and the inner peripheral surface of the reel; said first and second thread like means having opposite sense of longitudinal advance whereby a ballistically originated force moving said piston from the first position, axially, to the second position, rotates the piston and its sleeve in one direction thereby rotating the flexible element receiving reel in the opposite direction as to wind a flexible element thereon.

13. A ballistically actuated device as set forth in claim 12 wherein the first and second interengaging thread-like means each comprise a pair of cooperating helical grooves carrying a plurality of ball members therebetween.

References Cited by the Examiner

UNITED STATES PATENTS

| 3,077,324 | 2/1963 | Strickland | 242—107.4 X |
| 3,083,938 | 4/1963 | Brinkworth et al. | 244—122 |
| 3,096,957 | 7/1963 | Peterson et al. | 244—122 |

MERVIN STEIN, *Primary Examiner.*